US010776410B2

(12) United States Patent
Min

(10) Patent No.: US 10,776,410 B2
(45) Date of Patent: Sep. 15, 2020

(54) DATA CONSTRAINED RESOURCE ACCESS

(71) Applicant: Google LLC, Mountain View, CA (US)

(72) Inventor: Justin Min, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 16/265,544

(22) Filed: Feb. 1, 2019

(65) Prior Publication Data
US 2019/0163693 A1 May 30, 2019

Related U.S. Application Data

(63) Continuation of application No. 15/809,483, filed on Nov. 10, 2017, now Pat. No. 10,198,502, which is a
(Continued)

(51) Int. Cl.
*G06F 17/00* (2019.01)
*G06F 16/33* (2019.01)
(Continued)

(52) U.S. Cl.
CPC .......... *G06F 16/3331* (2019.01); *G06F 16/54* (2019.01); *G06F 16/738* (2019.01);
(Continued)

(58) Field of Classification Search
CPC .... G06F 16/3331; G06F 16/54; G06F 16/738; H04L 12/14; H04L 12/1403;
(Continued)

(56) References Cited

U.S. PATENT DOCUMENTS 5,913,026 A 6/1999 Bleidt et al.
6,061,733 A 5/2000 Bodin et al.
(Continued)

FOREIGN PATENT DOCUMENTS

EP 1968000 9/2008
EP 1548606 2/2012

OTHER PUBLICATIONS

R. Han, P. Bhagwat, R. LaMaire, T. Mummert, V. Perret and J. Rubas, "Dynamic adaptation in an image transcoding proxy for mobile Web browsing," in IEEE Personal Communications, vol. 5, No. 6, pp. 8-17, Dec. 1998, doi: 10.1109/98.736473. (Year: 1998).*

*Primary Examiner* — Syed H Hasan
(74) *Attorney, Agent, or Firm* — Fish & Richardson P.C.

(57) ABSTRACT

Methods, systems, and apparatus, including computer programs encoded on a computer storage medium, for managing data deliver for data constrained user devices. In one aspect, a method includes the actions of receiving, from a user device, requests for resources. For each of the requests, determining whether the user device is currently subject to a data constraint for receiving data responsive to the request. For each request for which the user device is determined to be subject to the data constraint, provide data that causes the user device to display a prompt to choose whether a resource responsive to the request is to be provided in the unrestricted data form or a restricted data form. A resource can be provided in an unrestricted data form has a first data size and provided in a restricted data form has a second data size that is less than the first data size.

15 Claims, 6 Drawing Sheets

Related U.S. Application Data continuation of application No. 14/804,180, filed on Jul. 20, 2015, now Pat. No. 9,836,528.

(51) Int. Cl.

| | |
|---|---|
| *H04M 15/00* | (2006.01) |
| *G06F 16/54* | (2019.01) |
| *G06F 16/738* | (2019.01) |
| *H04L 12/14* | (2006.01) |
| *H04W 4/24* | (2018.01) |

(52) U.S. Cl.
CPC ............ *H04L 12/14* (2013.01); *H04L 12/141* (2013.01); *H04L 12/1403* (2013.01); *H04L 12/1414* (2013.01); *H04M 15/60* (2013.01); *H04M 15/8214* (2013.01); *H04M 15/85* (2013.01); *H04M 15/851* (2013.01); *H04M 15/852* (2013.01); *H04M 15/853* (2013.01); *H04M 15/854* (2013.01); *H04W 4/24* (2013.01)

(58) Field of Classification Search
CPC .............. H04L 12/141; H04L 12/1414; H04M 15/8214; H04M 15/85; H04M 15/851; H04M 15/852; H04M 15/853; H04M 15/854; H04M 15/60; H04W 4/24
See application file for complete search history.

(56) References Cited

U.S. PATENT DOCUMENTS

| | | | |
|---|---|---|---|
| 6,563,517 B1 * | 5/2003 | Bhagwat | ............ H04N 21/6377 715/735 |
| 7,328,049 B2 | 2/2008 | Chanut et al. | |
| 7,577,667 B2 | 8/2009 | Hinshaw et al. | |
| 7,797,447 B1 | 9/2010 | Schilit | |
| 7,853,478 B2 | 12/2010 | Donahue et al. | |
| 8,145,989 B2 | 3/2012 | Kim et al. | |
| 8,463,869 B2 | 6/2013 | Morse et al. | |
| 8,484,568 B2 | 7/2013 | Rados et al. | |
| 8,555,184 B2 | 10/2013 | Hong et al. | |
| 8,612,291 B2 | 12/2013 | Huang | |
| 8,645,362 B1 | 2/2014 | Jain | |
| 8,751,516 B1 | 6/2014 | Wong | |
| 9,201,929 B1 | 12/2015 | Seo | |
| 9,552,438 B2 * | 1/2017 | Chaudhry | ........... G06F 16/9577 |
| 2001/0009855 A1 | 7/2001 | I'Anson | |
| 2001/0014868 A1 | 8/2001 | Herz et al. | |
| 2002/0104083 A1 | 8/2002 | Hendricks | |
| 2002/0143621 A1 | 10/2002 | Donnelly et al. | |
| 2003/0163528 A1 | 8/2003 | Banerjee | |
| 2003/0187806 A1 | 10/2003 | Banerjee et al. | |
| 2004/0002367 A1 | 1/2004 | Chanut | |
| 2004/0139018 A1 | 7/2004 | Anderson | |
| 2004/0215775 A1 | 10/2004 | Murray, Jr. et al. | |
| 2005/0125354 A1 | 6/2005 | Pisaris-Henderson et al. | |
| 2006/0200455 A1 | 9/2006 | Wilson | |
| 2007/0162335 A1 | 7/2007 | Mekikian | |
| 2007/0208829 A1 | 9/2007 | Kim et al. | |
| 2008/0033918 A1 | 2/2008 | Wilson | |
| 2008/0201225 A1 | 8/2008 | Maharajh et al. | |
| 2008/0228758 A1 | 9/2008 | Aaltonen et al. | |
| 2008/0287096 A1 | 11/2008 | Aaltonen | |
| 2009/0176482 A1 | 7/2009 | Martin et al. | |
| 2009/0271778 A1 | 10/2009 | Mandyam et al. | |
| 2009/0282127 A1 | 11/2009 | Leblanc | |
| 2010/0037248 A1 | 2/2010 | Lo et al. | |
| 2010/0057801 A1 | 3/2010 | Ramer et al. | |
| 2010/0228598 A1 | 9/2010 | Seuken et al. | |
| 2010/0278178 A1 | 11/2010 | Sridhar et al. | |
| 2010/0280960 A1 | 11/2010 | Ziotopoulos et al. | |
| 2010/0306080 A1 | 12/2010 | Trandal et al. | |
| 2010/0306311 A1 | 12/2010 | Mahe et al. | |
| 2011/0119071 A1 | 5/2011 | Phillips | |
| 2011/0235589 A1 | 9/2011 | Kristensen et al. | |
| 2012/0039290 A1 | 2/2012 | Vrzic et al. | |
| 2012/0079000 A1 | 3/2012 | Calcev et al. | |
| 2012/0208512 A1 | 8/2012 | Maharajh et al. | |
| 2012/0284608 A1 | 11/2012 | Huang | |
| 2012/0297302 A1 | 11/2012 | Barraclough | |
| 2013/0132854 A1 | 5/2013 | Raleigh | |
| 2014/0187195 A1 | 7/2014 | Pallares Lopez | |
| 2014/0214787 A1 | 7/2014 | Lorge | |

\* cited by examiner

DATA CONSTRAINED RESOURCE ACCESS

CROSS-REFERENCE TO RELATED APPLICATIONS

This application is a continuation application of, and claims priority to, U.S. patent application Ser. No. 15/809,483, filed on Nov. 10, 2017, which is a continuation of, and claims priority to, U.S. patent application Ser. No. 14/804,180, filed on Jul. 20, 2015. The disclosure of the foregoing application is incorporated herein by reference in its entirety for all purposes.

BACKGROUND

This specification relates to search processing.

The Internet provides access to a wide variety of resources. For example, video and/or audio files, as well as web pages for particular subjects or particular news articles, are accessible over the Internet. Also, the use of mobile devices is now ubiquitous, and users may access resources from any location in which they receive wireless service.

Many users around the world, however, are faced with data limits when using their mobile devices. Not knowing how much data is consumed by various activities often leads users to drastically underutilize data services, or, alternatively, cause users to incur data access fees. In the case of the former, users will often self-restrict their uses to a few tasks such as checking email and wait until they can access Wi-Fi to accomplish other tasks that may consume more data. This leads to underutilization of data, and the data access for which the user is paying for is essentially lost.

Conversely, if a user forgets to track data usage, the user may incur significant data costs. For example, a search query may invoke an image and video search, and may require several megabytes to load on a user device (or maybe even tens of megabytes). If a user is at a data limit for a service period, the processing of such queries and serving of such resources can accumulate a significant data overage for a service period.

There are also certain data consuming actions users can choose from search results, such as watching a video or listening to an audio file. Often times, users cannot know beforehand what the data cost will be for following through with the consuming action.

SUMMARY

In general, one innovative aspect of the subject matter described in this specification can be embodied in methods that include the actions of receiving, from a user device, requests for resources. For each of the requests, determining whether the user device is currently subject to a data constraint for receiving data responsive to the request. For each request for which the user device is determined not to be subject to the data constraint, provide a resource responsive to the request in an unrestricted data form. For each request for which the user device is determined to be subject to the data constraint, provide data that causes the user device to display a prompt to choose whether a resource responsive to the request is to be provided in the unrestricted data form or a restricted data form. A resource provided in an unrestricted data form has a first data size and provided in a restricted data form has a second data size that is less than the first data size. For at least one of the requests the user device is determined to be subject to the data constraint, and for at least another of the requests the user device is determined not to be subject to the data constraint.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The present systems and methods provide an option to receive search results in a restricted format or an unrestricted format, a choice which allows users to better manage data plans. Serving search results in restricted format results in a presentation of a search results resource that consumes less data than the traditional search results resource.

In some implementations, the present systems and methods provide a data balance impact notification for each resource listed on a search results resource, which allows a user to assess, for each resource, the impact the resource will have on the user's data plan if the resource is served to the user device. The data balance impact can be an indication of the amount of data to be used or remaining of a user's data plan if a user accesses a resource over the internet from a mobile device. By providing a restricted format for search results and a notification of data balances, users are better informed to make decisions while participating in actions that require the use of some amount of data from a user's mobile data plan.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The systems and methods described below relate to providing users with an option to present search results in a restricted data format (e.g., less text, less content, no images, no videos, etc.) based on whether a user device of the user is subject to a data usage constraint. The user device can be subject to the data usage constraint when, for example, a certain percentage or amount of data of a data usage plan for the user device remains. For example, a data usage constrain may occur when, for an 8 GB plan, the user device has only 2 GB remaining, and data is being accessed over the service channel (e.g., 4G instead of Wi Fi) subject to the data plan. In some implementations, the systems and methods can access information from a data provider regarding a user device's data usage to determine the impacts on the user device's account for accessing various resources on a user device.

Upon determining that a user device is subject to a data usage constraint, the user is prompted with an option to view search results responsive to a search query in a restricted data form. If the user accepts the offer to receive the restricted data form, the user is presented with the search results in the restricted data form. The restricted form requires less data and is accomplished by, for example, omitting videos and images and replacing them with corresponding stubs.

In some implementations, search results presented in response to a search query are also presented with various informational details for each resource referenced by a search result. The various informational details can describe aspects of the referenced resource as it relates to a user device's data plan. For example, on the search results resource, beside each search result, can be displayed the amount of data to access the resource referenced by the search result, the amount of data that would be used of a user's remaining data plan to access the resources, the amount of data remaining after accessing the resource, etc.

These features and other features are described in more detail below. Additionally, while the examples below are described in the context of search results and the underlying resources referenced by the search results, the systems and methods can be applied more generally to any resources provided to a user device that is subject to a data plan.

Example Operating Environment

Figure 1:
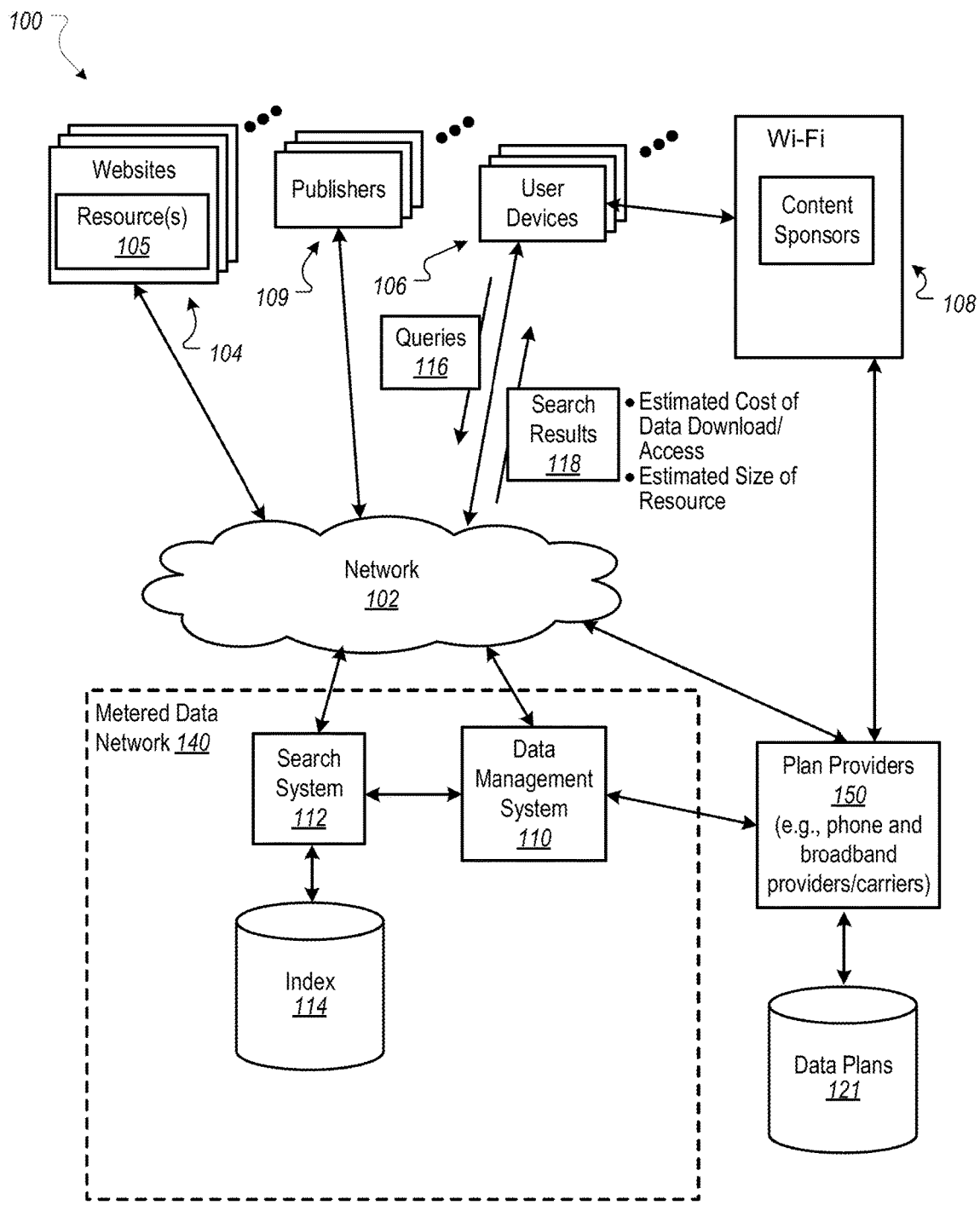
FIG. 1 is a block diagram of an example environment for delivering content.

FIG. 1 is a block diagram of an example environment 100 in which resources are provided to a user device 106. A computer network 102, such as a local area network (LAN), wide area network (WAN), the Internet, or a combination thereof, connects publisher web sites 104, user devices 106, and a search system 102. The search system can include a search engine 112, an index 114 of resources 105, and a data management system 110. The online environment 100 may include many thousands of publisher web sites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, image files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website.

To facilitate searching of these resources 105, the search engine 112 identifies the resources by crawling the publisher web sites 104 and indexing the resources provided by the publisher web sites 104. The resources are indexed and the index data are stored in the index 114.

The user devices 106 submit search queries to the search engine 112. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 112, or some other identifier that identifies the user device 106 or the user using the user device.

In response to the search request, the search engine 112 searches the index 114 to identify resources that are relevant to the queries. The search engine 112 identifies the resources in the form of search results and returns the search results to the user devices 106 in search results resource. A search result is data generated by the search engine 112 that identifies a resource or provides information that satisfies a particular search query. A search result for a resource can include a title, a snippet of text extracted from the resource, and a resource locator for the resource, e.g., the URL of the resource.

The user devices 106 receive the search results resource and render results for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

To manage data usage, in some implementations the data management system 110 interacts with plan providers 150 to access and provide information describing various aspects of a user device's data plan 121. For example, the data management system 110 can provide data describing the total amount of data remaining for a user device's data plan 121, a user device's data plan 121 cap, the amount used during a service period, etc. The data management system 110 interacts with the search engine 112 to provide data to include within a search result. The data management system 110 can also receive resource information from the search engine 112 to determine various data usage details based off of the resource information and the information received from the plan providers 150.

In other implementations in which the data management system 110 does not have access to plan provider data 150, users may specify data caps and periods, and the user device may include software that allows the user device to periodically access account data (e.g., daily), gather current data usage statistics and provide the current data to the data management system 110. The data management system 110 may use these statistics to then determine whether a user device is subject to a data constraint.

Operation of the data management system 110 and the functions it provides are described in more detail below.

Data Constraint Processing

Processing content when subject to a data constraint involves providing the user of the user device with information that either reduces the amount of data sent to the user device over a data plan and/or helps a user decide whether to select a resource given the impact of the selection of the resource will have on the user's data plan. In some implementations, a user device that is subject to a data constraint can be prompted with an option to be presented with restricted search results to reduce the amount of data that is used upon rendering search results. Additionally, after the search results are provided, whether in restricted or unrestricted form, then user may also be provided with information that describes the impact that selecting a resource referenced by a search result has on the user's data plan.

Typically, data usage constraints occur in the context of a data plan cap. A constraint exists, for example, where there is less than a threshold amount of data available/remaining in a user's data plan 121. For example, if a user has an 8 GB data plan, then a data constraint may occur when the user has only 30% of the data plan remaining for a data plan period. In this situation, the data constraint applies to all resources that can be accessed by the user device.

Another type of data constraint may occur when a particular resource may consume more than a threshold amount of a user's data plan. For example, a user may desire to download data that consists of a 2 GB file. However, if the 2 GB file is more than a threshold amount (e.g., 10%) of a user's monthly data plan, they system may determine the user device is operating under a data constraint for that particular resource. Thus, in this situation, a data constraint may occur only for a particular resource.

Figure 2A:
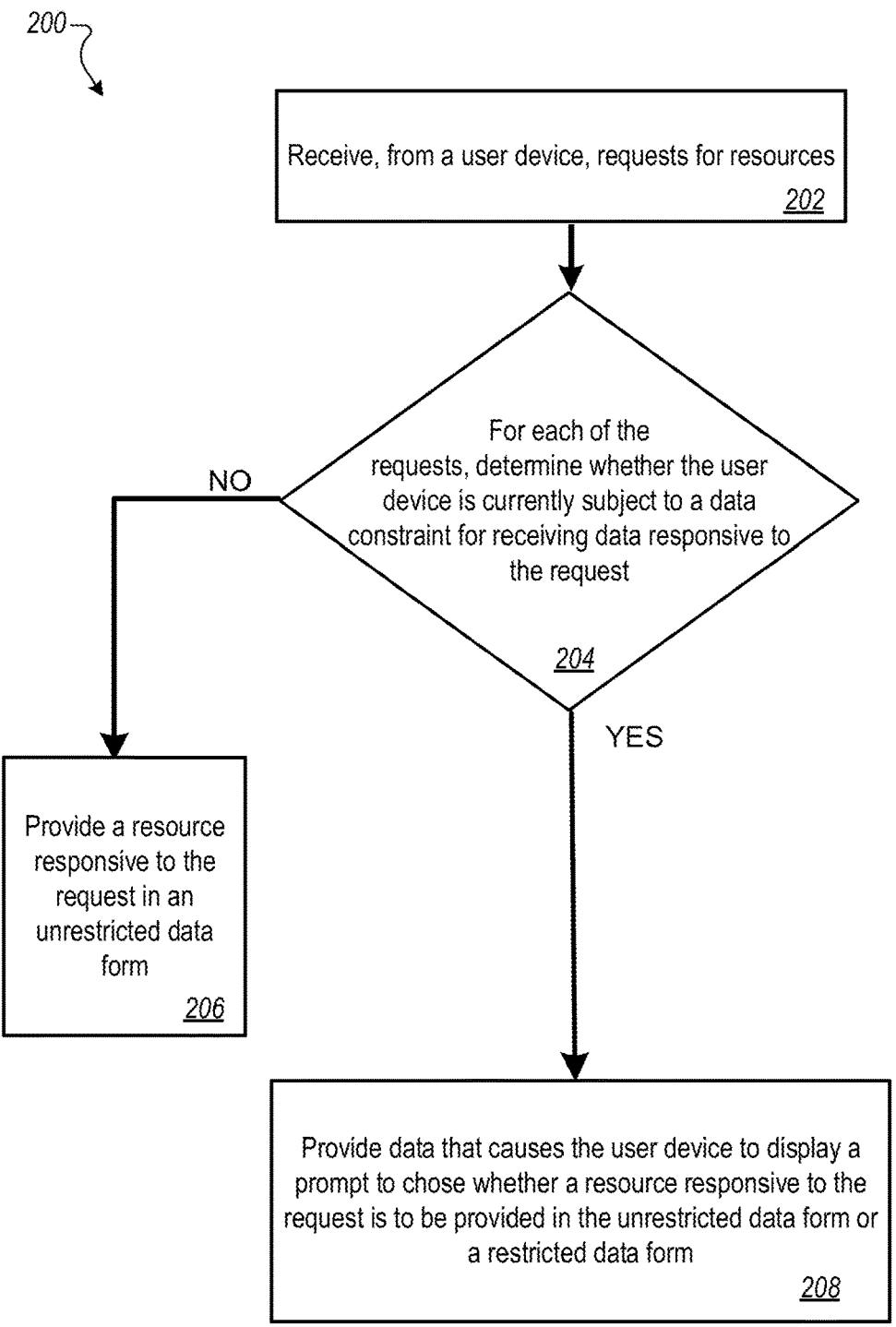
FIG. 2A is a flow chart of an example process for providing a restricted search result resource.

FIG. 2A is a flow chart of an example process 200 for providing a restricted search result resource that includes multiple search results. The process 200 may be implemented in the data management system 110.

The process receives from a user device requests for resources (202). The request for resources can be a search query 116 to a search engine 112 for resources 105 responsive to the search query.

For each of the requests, the process determines whether the user device is currently subject to a data constraint for receiving data responsive to the request (204). In some implementations, the data management system 110 accesses the current usage data statistics of the user device as described above and, optionally, the size of the resource to be provided to the user device. This determination may be subject to the user device 106 not accessing data over a Wi-Fi connection, i.e., the data constraint may only apply when the user device is accessing data over a cellular connection (or any other connection that may be subject to a data cap for a service period). Whether the user device is accessing over a Wi-Fi network or another network can be determined, for example, from packets received from the user device.

A determination that the user device 106 is not subject to a data constraint may occur when the user device 106 is connected to Wi-Fi, or has over a threshold amount of data left on a wireless plan (e.g., over 250M, 500 MB, 1 GB, etc.), the user device has an unlimited data plan 121, or a particular resource is less than a threshold size (e.g., less than 5 MB), etc. Other appropriate ways of determining whether a data constraint is or is not active can also be used.

Figure 2B:
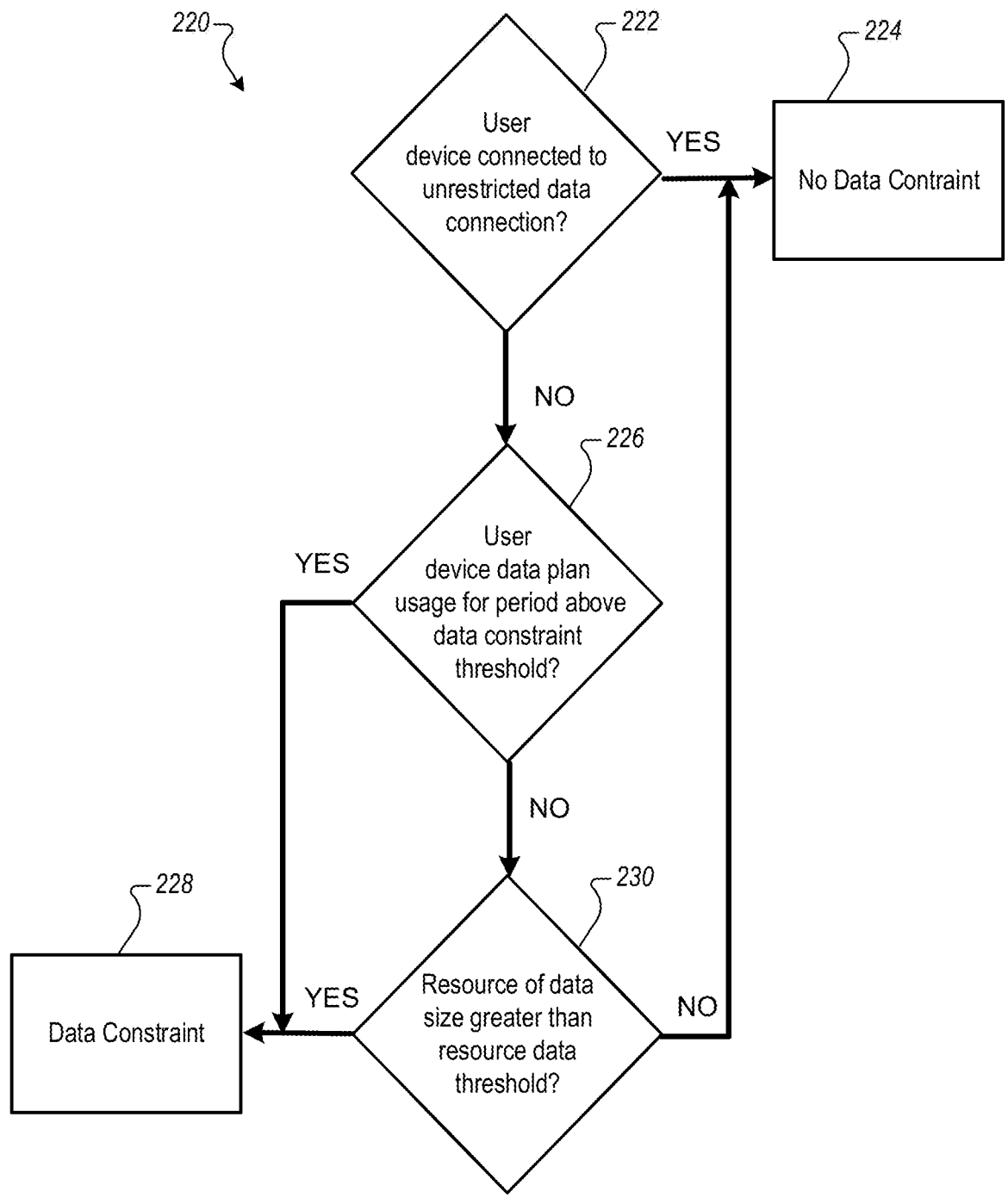
FIG. 2B is a flow chart of an example process for determining whether a user device is subject to a data constraint.

More specifically, FIG. 2B is a flow chart of an example process 220 for determining whether a user device is subject to a data constraint.

The process 220 determines whether the user device is connected to an unrestricted data connection (222). For example, the process 220 determines the user device 106 is connected to and receiving data over a Wi-Fi connection, or if the user device has an unlimited data plan. A positive determination for either will result in the process 220 determining there is no data constraint (224). For example, if the user device 106 is connected to and receiving data over a Wi-Fi connection, the data management system 110 determines the user device 106 is not subject to a data constraint. Alternatively, if the user device 106 has an unlimited data plan, then the data management system 110 determines there is no data constraint (224).

If the user device is connected to an unrestricted data connection, then the process determines whether the user device data plan usage for a period is above a data constraint threshold (226). For example, if a user device has a data plan cap of 1 GB and the user device has a threshold indicative of only 20% of the data plan remaining, the threshold for determining whether a user device 106 is subject to a data constraint is whether the user device has utilized less, equal to, or more than 800 MB. Thus, if the user device 106 has used more than the threshold amount of the data plan cap (e.g., over 800 MB of the data plan 121 has been utilized), the user device 106 is currently subject to a data constraint (228).

If the user device data plan usage for a period is not above a data constraint threshold, then the process 200 may optionally determine whether a resource is of a data size that is greater than a resource data threshold (230). A data size threshold can be indicative of a maximum amount of data to use when rendering resources on the user device 106 before offering a prompt to receive resources in the restricted data form. If the resource is of a data size that is greater than a resource data threshold, then the process 200 determines there is a data constraint; otherwise, the process 200 determines there is no data constraint.

In other implementations, determining whether the user device 106 is currently subject to the data constraint for receiving resources 105 responsive to the request can include determining a cost to download the resource 105, where the cost is based on a data size of the resource. The cost can be indicative of the cost per data unit (e.g., 0.25/MB). The cost can be a monetary cost or it can be a data cost (e.g., how much data will be used to provide the resources). A cost threshold can be determined based on the cost to present the resources 105 on the user device 106. The search system 112 determines whether or not the user device 106 is currently subject to the data constraint based on determining if the cost to provide the resources is less than, meets, or exceeds a threshold cost.

Various other processes can be used to determine whether a user device is subject to a data constraint and whether to provide an offer to receive resources in a restricted data form.

Returning now to FIG. 2A, for each request for which the user device is determined not to be subject to the data constraint, a resource 105 responsive to the request is provided in an unrestricted data form (206). In some implementations, unrestricted data form includes all data included in the resource, e.g., a resource is provided with images, videos, media, and text, none of which are held back to save data, etc. For example, when the data management system 110 determines that the user device 106 is not subject to a data constraint, and a search results page includes images and video, the search results page is provided with the images and video.

For each request for which the user device 106 is determined to be subject to the data constraint, the data management system 110 provides data, e.g., instructions, that causes the user device 106 to display a prompt to choose whether a resource responsive to the request is to be provided in the unrestricted data form or a restricted data form (208).

Should the user choose unrestricted data form, then the resource is provided in its full, unaltered form. Should the user, however, choose restricted form, then the resource is provided with one or more data elements removed from the resource. Such data elements that are removed may include images, video feeds and audio feeds. In their places may be corresponding stubs indicating the removed data element. The stubs may be individually selectable should the user desire to download the data element.

To generate the resource in restricted form, the data management system 110 may automatically strip out a predefined list of data elements from the code of the resource (e.g., the search results resource) and replace the data elements with the corresponding stubs. In other implementations, the search engine 112 may be instructed by the data management system 110 to strip out the predefined list of data elements. Other appropriate ways of providing a resource according to a data constraint can also be used.

Thus, a resource provided in an unrestricted data form has a first data size, while the same resource provided in a restricted data form has a second data size that is less than the first data size. For example, due to the additional media that can be incorporated into the unrestricted data form search results, the unrestricted data form will have a larger data size relative to the restricted data form. The data size describes how much data will be used to render the results in either of the data forms.

Regarding the process 200 described in FIG. 2A, for at least the first requests during a new period in a data plan, the user device 106 will be determined to not be subject to the data constraint. However, as time goes on, and assuming the user device is providing enough data to approach and eventually surpass data plan threshold that signals a data constraint, and the user device 106 will then be determined to be subject to the data constraint.

Example User Interfaces

Figure 3:
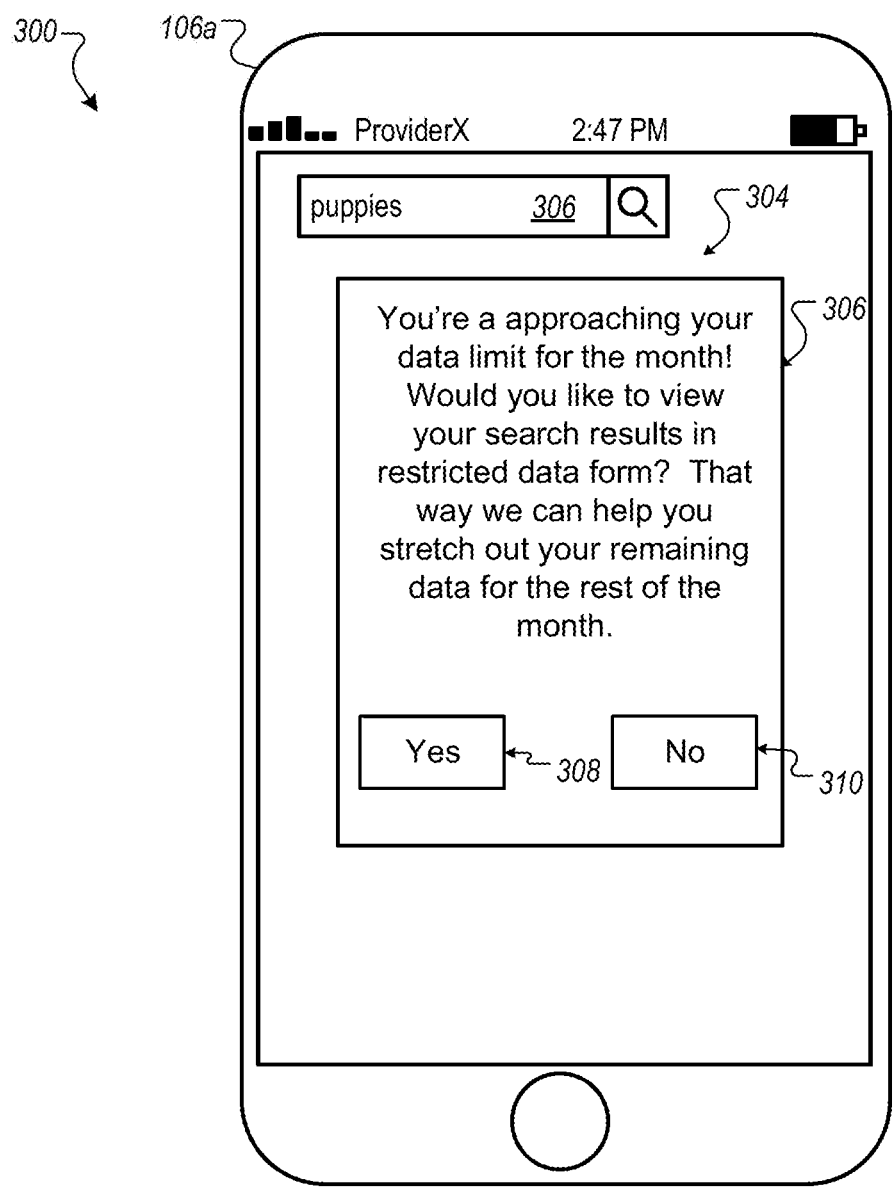
FIG. 3 is an illustration of an example device displaying a prompt to view resources in the restricted data form.

FIG. 3 is an illustration of an example device 106a displaying a prompt 306 to choose whether to view a search result resource in the restricted data form. In the example that follows, providing a resource in a restricted data form includes providing only textual data of the resource and precluding the providing of non-textual data (e.g., images, audio and video) of the resource. Typically, the non-textual data is provided with the resources only in the unrestricted data form.

In some implementations, content that may invoke user device operations that cause data to be transferred to and from the user device may also be removed when a resource is provided in restricted form. Examples of such content include scripts, forms, feeds, and dynamic content. The user may specify to have the content provided should the user desire to make use of the content.

As previously described in connection with FIG. 2A, the user is presented with a prompt to receive resources in the restricted data form when the search system 112 determines that the user device is subject to a data constraint.

In this example, the search system 112, in conjunction with the data management system 110, has determined that the user device 106a is currently subject to the data constraint. The search system 112 thus causes the user device 106a to present a prompt for the user to choose whether to deliver the resources 105 in a restricted data form.

Figure 4A:
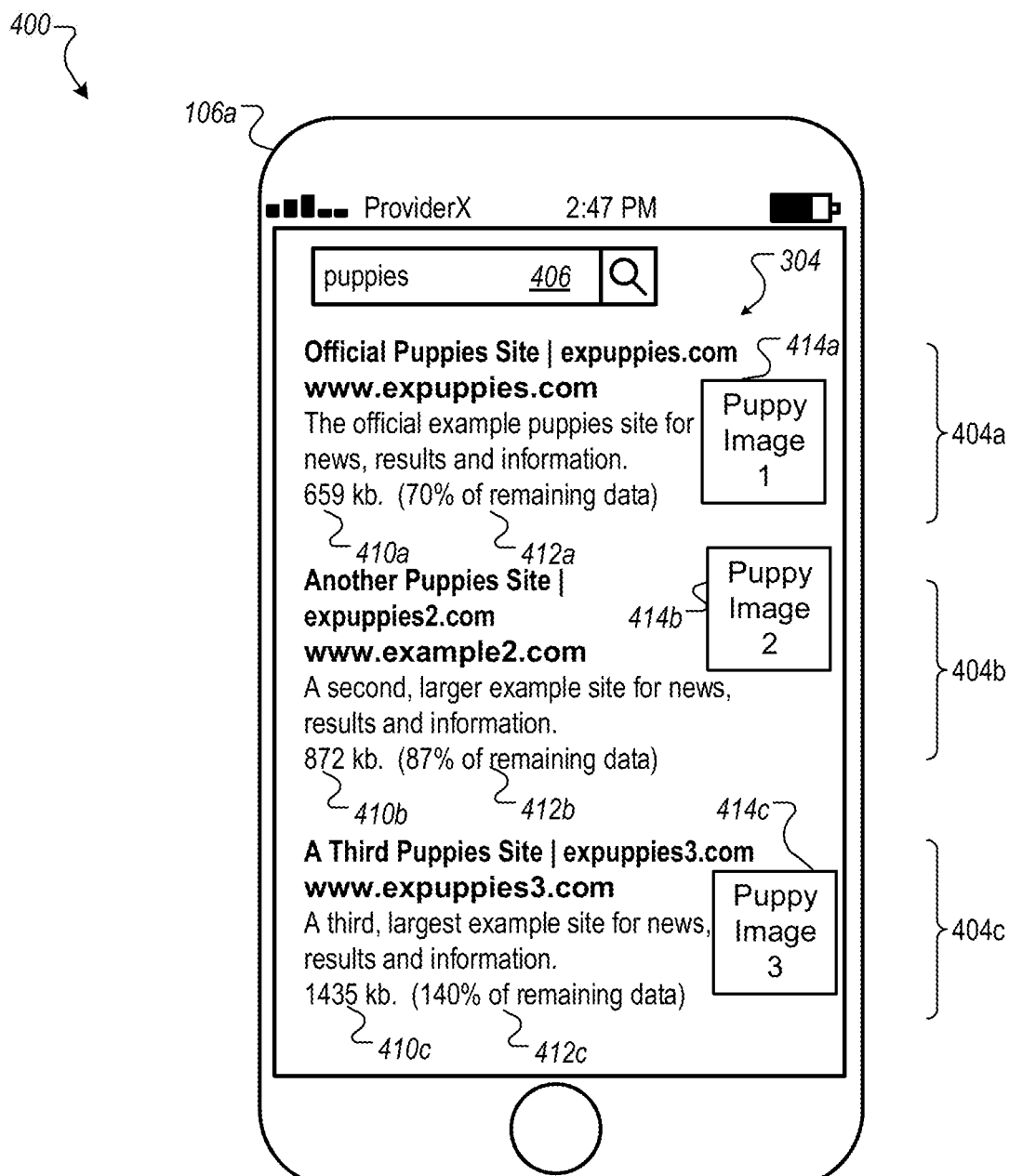
FIG. 4A is an illustration of an example device displaying search results in an unrestricted format.
Figure 4B:
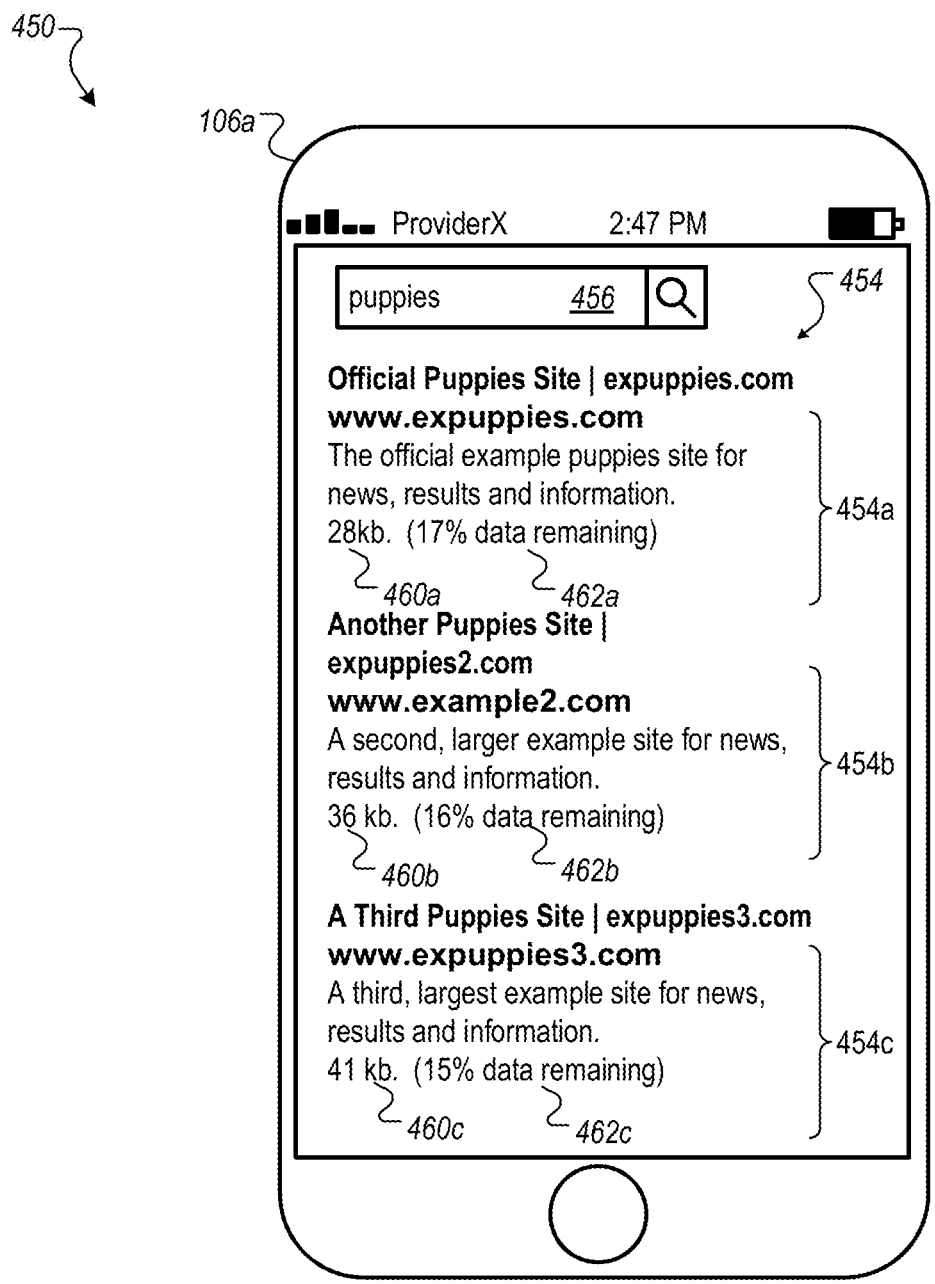
FIG. 4B is an illustration of an example device displaying search results resource in a restricted format.

Upon receiving the prompt to receive resources in the restricted form, a user is able to deny or accept the offer. FIGS. 4A and 4B illustrate implementation details that describe the unrestricted and the restricted data forms.

FIG. 4A is an illustration 400 of an example device 106a displaying search results in an unrestricted format. Here, for the search query "puppies" 406, three search results 404a-404c identify respective resources. Along with the listing of search results 404a-404c, three images of puppies 414a-414c are also displayed. The unrestricted data form presents textual content as well as non-textual content (e.g., images, videos, music, etc.).

Each search results resource can present the size of the resource, which is the amount of data 410a-410c that would be used if the resource were accessed. For example, the size of the resource for Official Puppies Site is 659 kb 410a, and so on.

In some implementations, the search results can include a data balance impact value that shows the impact on a user's data plan if a search result is selected. The impact can be expressed in a variety of ways. For example, the search results can present the amount of data that will be remaining 412a-c in a user device's data plan 121 if the resource was accessed. The data management system 110 interacts with the plan providers 150 to access data usage information for the particular user device 106a. The data management system 110 can determine, based off of the data usage information and the size of each referenced resource, how much of the user device's remaining data plan 412a-c will be used by accessing each resource. Further, the data management system 110 can provide the information regarding how much of the user device's remaining data plan 412a-c is used if the user device accesses a resource, so that the information can be displayed with each of the search results.

Assuming there is 1 MB of data plan left for the user device in FIG. 4A, the corresponding data balance impact are expressed as the amount the requested resource will consume of the remaining balance.

The search results can be presented on the user device without non-textual content e.g., as shown in FIG. 4B, which FIG. 4B is an illustration 450 of an example user device 106a displaying search results in a restricted data form. The search results shown in FIG. 4B are the restricted data form, which only presents textual content. In some implementations, the textual content is displayed in restricted text format, which limits the amount of text presented relative to an unrestricted text format that displays the same amount of text as would be shown in the unrestricted data form. In other implementations, the text is displayed in an unrestricted text format. The restricted data form provides search results responsive to a search query such that the search results are presented using less data than the unrestricted data form search results. Similar to FIG. 4A, the restricted data form can present the size of the resources 460a-460c referenced by the search results.

In some implementations, upon accepting the offer to receive the search results in the restricted form, the search engine 112, in combination with the data management system 110, can further cause a resource that is selected from a search result to be automatically presented in restricted form. For example, as shown in FIG. 4B, the size of the resources 460a-460c (28 kb, 36 kb, and 41 kb) are much less relative to the size of the resources that were illustrated in FIG. 4A (e.g., 659 kb, 872 kb, and 1435 kb). In other implementations, the resources we are presented in unrestricted form, regardless of whether the search results are presented in restricted from.

Also in FIG. 4B, the search results (e.g., in the restricted data form and/or the unrestricted data form) can present the amount of data that will be remaining 462a-462c if the resource is accessed. The data management system 110 can determine, based off of accessed data usage information from plan providers 150 and the size of each resource and how much of the user device's data plan 121 remains by accessing each of the resources. Further, the data management system 110 can provide the information regarding how much of the user device's data plan 121 remains 412a-412c if the user device access a resource so that the information can be displayed with each of the resources within the search results.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   determining, for a user device, whether the user device is subject to a data constraint for receiving resources at the user device; and
   in response to determining that the user device is currently subject to the data constraint for receiving resources at the user device:
      in response to data indicating the user device is to receive a resource, receiving, at the user device, data that causes the user device to display an indication of the resource in restricted form, wherein the indication of the resource in restricted form is selectable by the user;
      in response to a selection of the indication of the resource in restricted form, providing the resource to the user device in an unrestricted form;
   wherein:
      a resource provided in an unrestricted form has a first data size;
      the data that causes the user device to display an indication of the resource in restricted form has a second data size that is less than the first data size; and
      in response determining that the user device is currently not subject to the data constraint for receiving resources at the user device, providing, to the user device, receiving, at the user device, the resource in the unrestricted form.

2. The method of claim 1, wherein the resource in the unrestricted form is an image, and the indication of the resource in restricted form is a stub that indicate the image can be downloaded to the user device.

3. The method of claim 1, wherein determining that the user device is currently subject to the data constraint for receiving resources at the user device comprises:
   determining that the user device is not connected to and receiving data over a Wi-Fi connection; and
   determining the user device is currently subject to the data constraint in response to determining the user device is not connected to the Wi-Fi connection.

4. The method of claim 1, wherein determining that the user device is currently subject to the data constraint for receiving resources at the user device comprises:
   determining that the user device is within a threshold amount of a data plan cap; and
   determining the user device is currently subject to the data constraint in response to determining the user device is within the threshold amount of the data plan cap.

5. The method of claim 1, wherein determining that the user device is currently subject to the data constraint for receiving resources at the user device comprises:

determining that the resource in unrestricted data form exceeds a data size threshold; and
determining the user device is currently subject to the data constraint in response to determining the resource in unrestricted data form exceeds the data size threshold.

6. The method of claim 1, wherein determining that the user device is currently subject to the data constraint for receiving resources at the user device comprises:
determining a cost to download the resource, the cost based on a data size of the resource; and
determining that the user device is currently subject to the data constraint in response to determining the cost exceeds a threshold cost.

7. The method of claim 1, wherein determining that the user device is currently subject to the data constraint for receiving resources at the user device comprises determining that the user device is currently subject to the data constraint based on a user selection.

8. A system, comprising:
a data processing apparatus configured to:
determine, for a user device, whether the user device is subject to a data constraint for receiving resources at the user device;
in response to determining that the user device is currently subject to the data constraint for receiving resources at the user device:
in response to data indicating the user device is to receive a resource, receive, at the user device, data that causes the user device to display an indication of the resource in restricted form, wherein the indication of the resource in restricted form is selectable by the user;
in response to a selection of the indication of the resource in restricted form, provide the resource to the user device in an unrestricted form;
wherein:
a resource provided in an unrestricted form has a first data size;
the data that causes the user device to display an indication of the resource in restricted form has a second data size that is less than the first data size; and
in response determining that the user device is currently not subject to the data constraint for receiving resources at the user device, providing, to the user device, receiving, at the user device, the resource in the unrestricted form.

9. The system of claim 8, wherein the resource in the unrestricted form is an image, and the indication of the resource in restricted form is a stub that indicate the image can be downloaded to the user device.

10. The system of claim 8, wherein determining that the user device is currently subject to the data constraint for receiving resources at the user device comprises:
determining that the user device is not connected to and receiving data over a Wi-Fi connection; and
determining the user device is currently subject to the data constraint in response to determining the user device is not connected to the Wi-Fi connection.

11. The system of claim 8, wherein determining that the user device is currently subject to the data constraint for receiving resources at the user device comprises:
determining that the user device is within a threshold amount of a data plan cap; and
determining the user device is currently subject to the data constraint in response to determining the user device is within the threshold amount of the data plan cap.

12. The system of claim 8, wherein determining that the user device is currently subject to the data constraint for receiving resources at the user device comprises:
determining that the resource in unrestricted data form exceeds a data size threshold; and
determining the user device is currently subject to the data constraint in response to determining the resource in unrestricted data form exceeds the data size threshold.

13. The system of claim 8, wherein determining that the user device is currently subject to the data constraint for receiving resources at the user device comprises:
determining a cost to download the resource, the cost based on a data size of the resource; and
determining that the user device is currently subject to the data constraint in response to determining the cost exceeds a threshold cost.

14. The system of claim 8, wherein determining that the user device is currently subject to the data constraint for receiving resources at the user device comprises determining that the user device is currently subject to the data constraint based on a user selection.

15. A non-transitory computer storage medium encoded with a computer program, the program comprising instructions that when executed by data processing apparatus cause the data processing apparatus to perform operations comprising:
determining, for a user device, whether the user device is subject to a data constraint for receiving resources at the user device; and
in response determining that the user device is currently subject to the data constraint for receiving resources at the user device:
in response to data indicating the user device is to receive a resource, receiving, at the user device, data that causes the user device to display an indication of the resource in restricted form, wherein the indication of the resource in restricted form is selectable by the user;
in response to a selection of the indication of the resource in restricted form, providing the resource to the user device in an unrestricted form;
wherein:
a resource provided in an unrestricted form has a first data size;
the data that causes the user device to display an indication of the resource in restricted form has a second data size that is less than the first data size; and
in response determining that the user device is currently not subject to the data constraint for receiving resources at the user device, providing, to the user device, receiving, at the user device, the resource in the unrestricted form.

* * * * *